United States Patent [19]
Gustafsson et al.

[11] Patent Number: 5,493,097
[45] Date of Patent: Feb. 20, 1996

[54] METHOD OF FORMING A PLATE BODY

[75] Inventors: Jukka Gustafsson, Mynämäki; Kalevi Heino, Turku, both of Finland

[73] Assignee: Kvaerner Masa-Yards OY, Helsinki, Finland

[21] Appl. No.: 261,339

[22] Filed: Jun. 16, 1994

[30] Foreign Application Priority Data

Jun. 17, 1993 [FI] Finland ................................ 932780

[51] Int. Cl.$^6$ ........................................................ B23K 9/00
[52] U.S. Cl. .................................... 219/137 R; 219/158
[58] Field of Search ......................... 219/73, 73.2, 124.1, 219/125.1, 137 R, 137 PS, 158, 160; 269/21

[56] References Cited

U.S. PATENT DOCUMENTS

| | | |
|---|---|---|
| 3,197,604 | 7/1965 | Turbyville, Jr. et al. ................. 219/73 |
| 3,351,734 | 11/1967 | Arikawa et al. .................... 219/137 R |
| 3,575,574 | 4/1971 | Almqvist . |
| 4,075,453 | 2/1978 | Roberts . |
| 4,550,244 | 10/1985 | West et al. .............................. 219/158 |

FOREIGN PATENT DOCUMENTS

| | | |
|---|---|---|
| 2236936 | 3/1974 | Germany . |
| 2-11266 | 1/1990 | Japan ................. 219/137 R |
| 3-133574 | 6/1991 | Japan ...................... 219/158 |
| 122106 | 5/1971 | Norway . |
| 366674 | 5/1974 | Sweden . |
| 611824 | 6/1979 | Switzerland . |
| 1398102 | 6/1975 | United Kingdom . |
| 1402410 | 8/1975 | United Kingdom . |

*Primary Examiner*—Clifford C. Shaw
*Attorney, Agent, or Firm*—Smith-Hill and Bedell

[57] ABSTRACT

A plate body is formed from two plane metal plates each at least 5 mm thick and having an edge at least 10 meters long, by machining each plate along its edge to form a welding groove with high accuracy relative to the dimensions and shape of the groove and with a smooth groove surface. The groove extends from a first side of each plate through only part of the thickness of the plates to leave a root area at the second side of the plate. The plates are supported in the vicinity of the welding groove from the second side of the plates by a support bed and are retained by use of suction in relative positions such that the root areas of the two plates are in confronting and contacting relationship. A weld is created in the welding groove by butt joint welding from the first side only of the plates.

21 Claims, 2 Drawing Sheets

METHOD OF FORMING A PLATE BODY

This invention relates to a method of forming a plate body by welding large plates together and to a plate body produced by the method.

In the shipbuilding industry, large numbers of plane plates are welded together on a mass production basis using automatic welding machines to form ship's decks, hulls and the like. Because the plate bodies to be manufactured have an extremely large area, it is economically desirable to work with as large plate blanks as possible. A typical plate blank used in the shipbuilding industry is over 10 meters long, often close to 20 meters long. The joining of plate blanks of these sizes to one another by welding is demanding work, because the high temperatures generated by the welding can cause deformations in the plates during the welding operation itself and/or after the welding operation when, for example, welding shrinkage causes unevenness in the plates. Elimination of unevenness caused by welding shrinkage, for example by the flame straightening method, is both difficult and time-consuming.

Further, traditional preparatory actions for joining large plates together by welding are difficult and time-consuming and require a lot of space for their execution. Traditionally, a small gap is maintained between plates to be welded together to facilitate carrying out the entire welding operation from one side only of the plates. The gap should be of uniform width along the entire welding groove, within a reasonable tolerance. Therefore, the plates must be positioned precisely with respect to each other, and this implies that it is necessary to measure the width of the gap, adjust the relative positions of the plates, and attach the plates firmly to a supporting base so that they will remain in their adjusted positions. In addition to the support of the plates by the base, short tack welds are traditionally used to secure the plates to one another in advance of the main welding process. The tack welding requires time-consuming manual work, and if the tack welding takes place other than at the site proposed for the main weld itself, it is necessary to reserve a work area for the tack welding that is as large as that used for the main welding process, and so the welding process as a whole requires twice the working space than would be required if all operations could be done at a single work station.

An essential feature of mass production is that it be possible to produce numerous units of the product without significant variation in dimension or quality from unit to unit. Thus, each production step is required to give the same result, subject to a tolerance range. Moreover, it is important in mass production that the handling of tools, workpieces etc. be made as easy and expeditious as possible. Accordingly, speed of execution is an important factor in determining whether a particular step is suited for including in a mass production method.

SUMMARY OF THE INVENTION

One aim of this invention is to simplify the edge welding together of large plates and to improve the quality of the weld as well as that of the manufactured plate body.

According to the present invention there is provided a method of forming a plate body from two metal plates each at least 5 mm thick and having first and second opposite sides and an edge at least 10 meters long, comprising machining each plate along said edge to form a welding groove with high accuracy relative to the dimensions and shape of the groove and with a smooth groove surface, the groove extending from the first side of each plate through only part of the thickness of the plates to leave a root area at the second side of each plate, supporting the plates in the vicinity of the welding groove from the second side of the plates by a support bed, retaining the plates by use of suction in relative positions such that the root areas of the two plates are in confronting and contacting relationship, and creating a weld in the welding groove by butt joint welding from the first side only of the plates.

Preferably, the welding groove is formed by mechanical cutting of the plates. This distinguishes over the traditional method of forming a plate body, in which the welding groove is formed by flame cutting the plates along their edges. The plates may be cut by form milling, which produces a surface that is substantially more even than can be obtained by conventional flame cutting processes, but other working methods are not ruled out, provided that a smooth enough surface with an accurate enough shape can be produced. By paying enough attention to the uniformity of the shape of the welding groove over its entire length and to the quality and the smoothness of the surfaces of the welding groove, the entire welding operation may be completed without leaving the traditional gap between the plates. By reliably reserving a root portion at the bottom of the welding groove, and reliably limiting the height of the root portion, it is possible to weld the plates together from one side only without maintaining an air gap between the plates. By omitting the gap, the advantage is obtained that each of the plates to be welded together receives mutual support from the other plate via the root portion of the welding groove, which facilitates adjustment work and reduces the demands for exact adjustment and prior fixing of the plates.

The activation and release of the suction fixing device by which the plates are retained in position on the support bed can be quick and simple.

It has been found that by utilizing a method according to the invention, large welded plate bodies of uniform quality and dimension may be produced at considerably lower cost and more rapidly than by using traditional methods. Also the capital cost of the necessary equipment can be significantly reduced. Savings of the order of about $200,000 per work site are possible. Accordingly, the method according to the invention is well suited to mass production of plate bodies.

The suction fixing device used in a method according to the invention has to be arranged so that the high temperature generated by the welding does not have a harmful effect on the sealing of the suction fixing device. Desirably, therefore, the part of each suction fixing device which is nearest to the welding groove is spaced from the welding groove by a distance of at least 50 mm.

It is easier to control the welding process if a root support made of a material of high thermal conductivity, preferably copper, is located under the plates to be welded together, and the root support has, immediately under the welding groove, a recess extending in the same direction as the groove for receiving welding powder or shielding gas. When steel is being welded, the recess of the root support can be filled with welding powder before fixing the plates in their welding position. When aluminum or stainless steel is to be welded, shielding gas can be led to the recess in the root support. When welding stainless steel, it is also possible to use a welding powder, developed for this purpose, but this is quite unusual. The use of welding powder or shielding gas in the manner here discussed has been found to improve the quality of the weld.

The root support may advantageously be cooled, for example by water or by another fluent coolant. Conveniently, a coolant duct is provided in the root support. The most advantageous solution is usually that a coolant circulation is arranged in which the temperature of the circulating coolant is monitored and adjusted. By cooling the root support it is possible to obtain a favorable control of the heat stresses caused during the welding.

The root area at the bottom of the welding groove, where the plates to be welded are in contact with each other, serves the purpose of providing an abutment surface on each plate against which the other plate can be reliably positioned. Moreover, it protects the root support and other equipment at the underside of the plates from the effects of the high temperatures at the upper side of the plates. The root area has to have a relatively small height, typically between 2 and 4 mm, depending on the thickness of the plates, the lower values, of course, being used for thinner plates and the higher values for thicker plates. When the plate thickness is within the range 5 to 25 mm, it is, however, seldom warranted to use a root height greater than 3 mm. An advantageous shape for the welding groove is the V-shape, in which the angle between the side surfaces of the V is from 50° to 65°, preferably from 55° to 60°. The V-shape is advantageous because it is easy to make. The noted groove angles have been selected for creating the best conditions for successful welding.

When steel is welded, it is very advantageous to use an automatic welding machine that employs the so-called twin-arc or double wire method, in which two welding wires located close together are brought to the same weld pool through the same contact nozzle, the welding wires receiving current from the same welding power source. The welding wires are preferably brought to the pool in line in the direction of the welding groove. By this welding method the speed of the welding can be raised remarkably so that it approaches the value of 1 meter/minute. This high welding speed is particularly favorable with regard to mass production.

The invention also extends to a large plate body formed by the method of the invention, and, in particular, to a deck or side portion of the hull of a ship.

BRIEF DESCRIPTION OF THE DRAWINGS

The invention will now be described in greater detail with reference to the accompanying drawings, in which.

DETAILED DESCRIPTION

Figure 1:
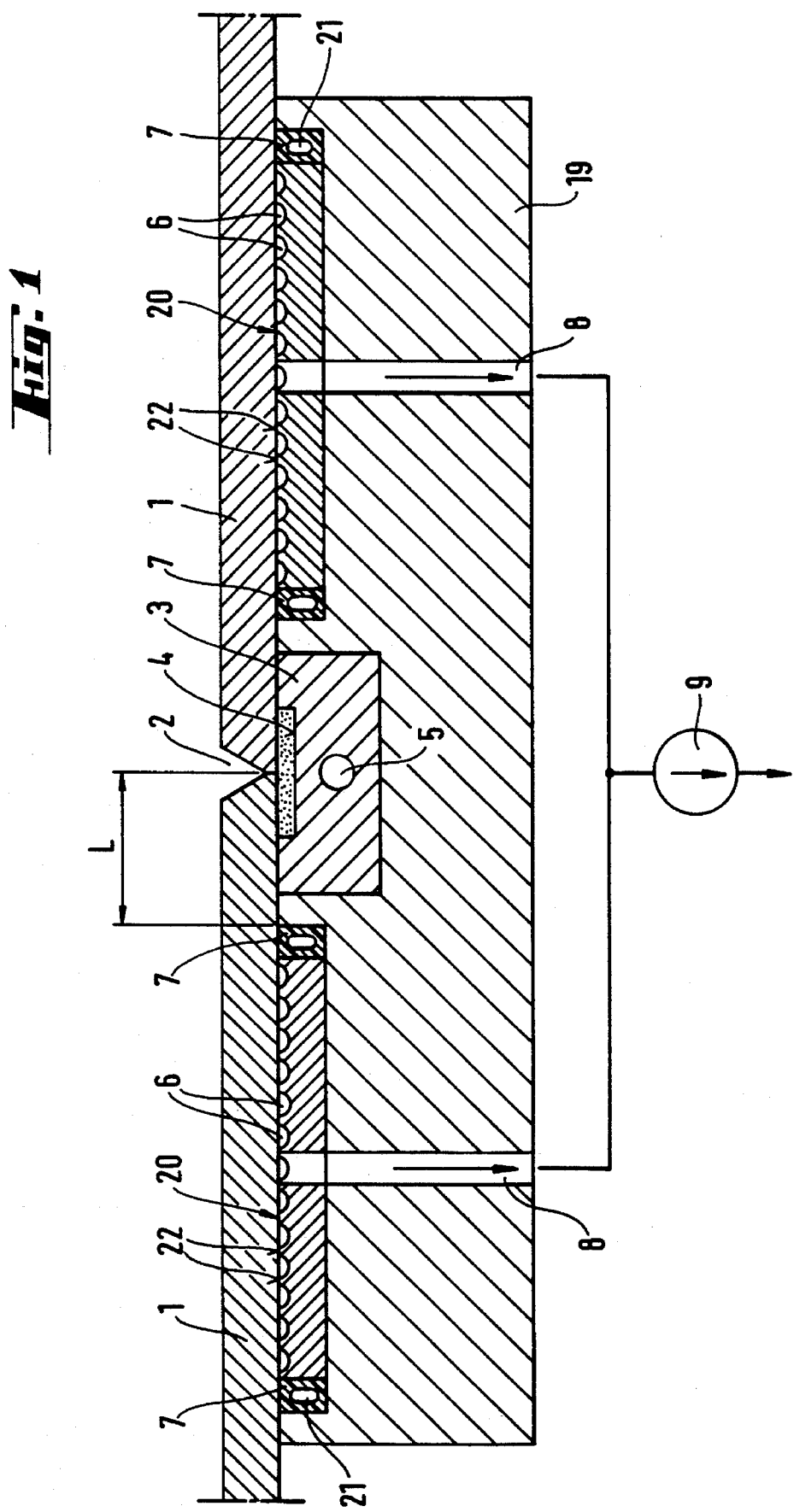
FIG. 1 schematically shows in cross-section a welding arrangement intended for use in carrying out a method according to the invention.

In the drawings, 1 indicates two plates to be butt joint welded together from one side, 2 a welding groove provided between the plates 1, 3 a backing to the groove and 4 a recess in the backing extending in the direction of the groove 2. In the backing 3 there is provided a cooling duct 5, through which a fluent coolant, for example water, can be circulated. The backing 3 is made of a material with good thermal conductivity, for example copper.

The plates 1 are supported in the required relative disposition by means of a suction fixing device including a bed 19 with a rigid (e.g. steel) suction support element 20, provided with suction grooves 6, and a pair of edge sealing strips 7 of elastic material. In each sealing strip 7, a duct 21 may be provided. Pressurized air is led to the duct 21 at the beginning of a welding operation in order to improve the air-tightness of the suction support element 20. The suction grooves 6 communicate via respective suction ducts 8 with a vacuum pump 9, by means of which a powerful enough partial vacuum is produced in the suction grooves 6 to hold the plates 1 in place. The ridges 22 between the suction grooves 6 support each plate 1 in the respective suction fixing area. Suction fixation of plates to be welded is known from, for example, DE A 2,236,936.

At least the sealing strip 7 close to the weld groove 2 must withstand some temperature rise. It is recommended that each strip 7 can withstand a temperature of at least 300° C. In order that the temperature at the seal should not rise too high, it is recommended that the distance L from the center line of the welding groove 2 to the nearest sealing strip 7 be at least 50 mm.

The recess 4 in the backing 3 is, during steel welding, filled with a welding powder, but when welding aluminum, for example, it may be used as a duct, through which a shielding gas can be led under the welding groove. The recess 4 does not have to be deep, and a depth of a few millimeters is normally sufficient.

Figure 2:
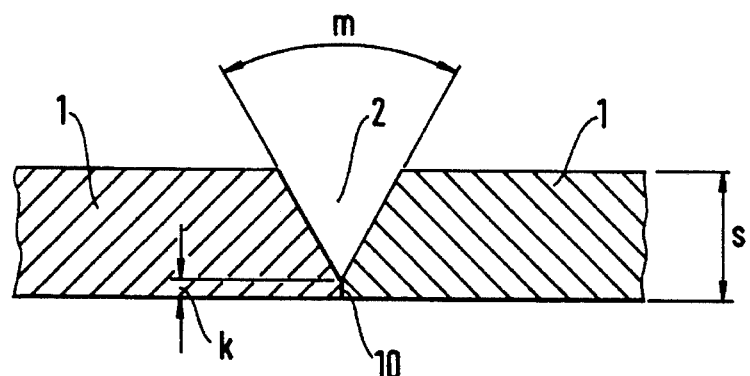
FIG. 2 shows a cross-section of a welding groove created for the method of the invention.

In FIG. 2 a preferred shape for the welding groove 2 is shown in greater detail. The groove is V-shaped and its V-angle m is in the range 50° to 60°. Some variation in the V-angle is tolerable but better groove accuracy and uniformity results in better weld quality. At the bottom of the V-shaped groove 2 there is a root part 10, the height k of which is, depending on the thickness of the plates 1 to be welded, between 2 and 4 mm, preferably not more than 3 mm. The height k of the root area should not normally be more than 40 percent of the thickness of the plates to be joined. For steel welding, the plate thickness s is preferably within the range 5 to 25 mm, but for aluminum welding the thickness of the plates 1 may be much greater. The plates support one another at the root part 10, and this makes the relative positioning of the plates 1 easier, because the exact fixing of the plates in a certain position relative to the backing 3 is not important and their position relative to one another is determined by the contact surfaces of the root part 10.

The maximum width w of the groove at the upper surface of the plates may vary somewhat along the length of the groove. A variation of up to 20 percent of the average maximum width can normally be tolerated, but it is preferred that the variation be no more than 10 percent. Variations in the width of the groove might arise from a variation in the beveling along the edge of one or both plates, which, in turn, may be caused by a deviation between the configuration of the edge of the plate and the path followed by the milling tool.

Figure 3:
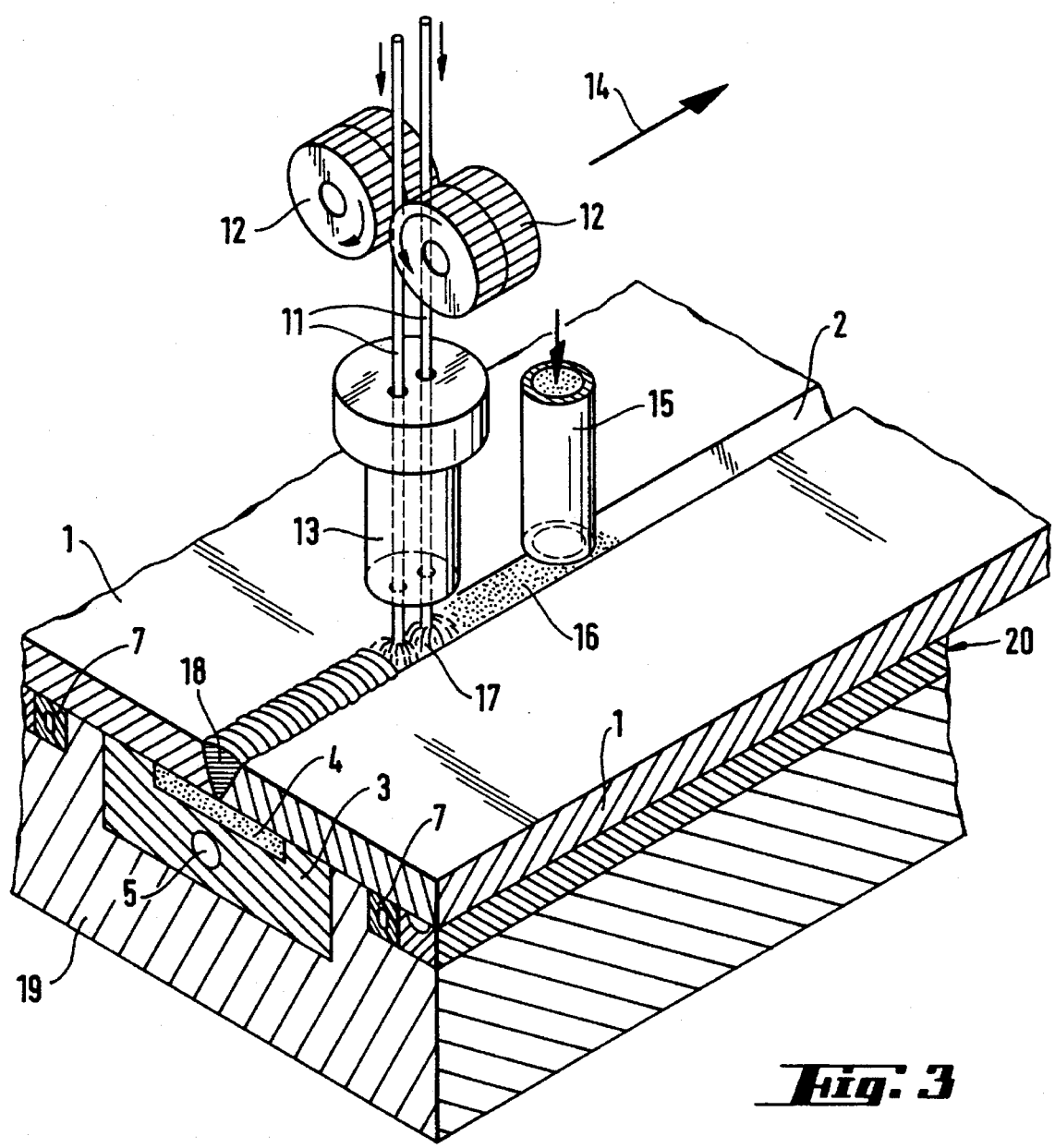
FIG. 3 is a schematic perspective view of the application of twin-arc welding to the method according to the invention.

FIG. 3 shows how a plate body can be formed by the method according to the invention by using the so-called twin-arc or double wire arrangement to weld two steel plates 1,1 together. Two welding wires 11, which are in line one after the other in the length direction of the welding groove 2, are fed by means of feed rollers 12 through a contact nozzle 13 to a welding pool 17. The welding advances in the direction of the arrow 14. Welding powder 16 is fed through a pipe 15 to the groove 2 just downstream of the welding pool 17. The parts 11, 12, 13, and 15 move with the same speed in the direction of the arrow 14 along the groove 2. 18 shows the completed weld.

The method described above allows production of welds of uniform quality and strength and is therefore particularly suited to mass production of a large number of plate bodies.

The invention is not limited to the embodiment shown, since several modifications thereof are feasible within the scope of the following claims. For example, although it is preferred that the plates be plane, the plates may also have some degree of curvature, provided that the suction fixing device is suitably adapted to fix the plates in position. Further, although the invention relates primarily to straight welds, because most automatic welding machines are adapted for straight welds, departures from a straight weld are feasible.

We claim:

1. A method for mass producing plate bodies each composed of two metal plates joined together by welding, and wherein each plate is at least 5 mm thick and has first and second opposite sides and an edge at least 10 meters long, said method comprising cutting each plate along said edge by use of a mechanical cutting tool to form a welding groove with high accuracy relative to the dimensions and shape of the groove and with a smooth groove surface, the groove extending from the first side of each plate through only part of the thickness of the plates to leave a root area at the second side of each plate, supporting the plates in the vicinity of the welding groove from the second side of the plates by a support bed, retaining the plates by use of suction in relative positions such that the root area of the two plates are in confronting and contacting relationship, and creating a weld in the welding groove by butt joint welding from the first side only of the plates.

2. A method according to claim 1, wherein the step of machining the plates comprises form milling the plates.

3. A method according to claim 1, wherein the step of retaining the plates by use of suction comprises employing first and second suction fixing devices incorporated in the support bed, and wherein each suction device is spaced from the welding groove by at least 50 mm.

4. A method according to claim 1, comprising supporting the plates by a support bed that includes a root support of high thermal conductivity, and wherein the root support includes a recess under the welding groove and extending in the longitudinal direction of the welding groove.

5. A method according to claim 4, wherein the plates are made of steel, the step of supporting the plates comprises setting the plates in said relative positions, and the method comprises placing welding powder in the recess of the root support before setting the plates in said relative positions.

6. A method according to claim 5, wherein the step of creating a weld in the welding groove is performed by twin-arc welding.

7. A method according to claim 4, comprising supplying shielding gas to the recess during the step of creating a weld in the welding groove.

8. A method according to claim 4, wherein the root support is formed with a coolant flow duct, and the method comprises supplying a fluent coolant to the duct for cooling the root support.

9. A method according to claim 1, wherein the height of the root area is no more than 40 percent of the thickness of the plates.

10. A method according to claim 1, wherein the height of the root area is in the range from about 2 mm to about 4 mm.

11. A method according to claim 10, wherein the height of the root area is less than 3 mm.

12. A method according to claim 1, wherein the welding groove has a V-shape with an angle between the side surfaces of the groove in the range from about 50° to about 65°.

13. A method according to claim 12, wherein the angle between the side surfaces of the groove is in the range from 55° to 60°.

14. A method according to claim 12, wherein the maximum width of the groove varies along the length of the groove by no more than 20 percent of the average value of the maximum width of the groove.

15. A method according to claim 12, wherein the maximum width of the groove varies along the length of the groove by no more than 10 percent of the average value of the maximum width of the groove.

16. A method according to claim 1, wherein the plates are made of steel and the step of creating a weld in the welding groove comprises placing two welding wires close together to enter a common weld pool through a common contact nozzle, and supplying current to the welding wires from a common welding power source.

17. A plate body formed by a method according to claim 1.

18. A method of forming a plate body from two metal plates each at least 5 mm thick and having first and second opposite sides and at least one edge that is at least 10 meters long, comprising:

(a) beveling each plate along said one edge by cutting the plate with a mechanical cutting tool, whereby the plate is relieved at its first side relative to its second side along said one edge, (b) placing the plates in relative positions such that said one edge of one plate abuts said one edge of the other plate and the bevels of the two plates form a welding groove extending from the first side of each plate through only part of the thickness of the plates to leave a root area at the second side of each plate, the root areas of the two plates being in confronting and contacting relationship, (c) supporting the plates from the second side of the plates in the vicinity of the welding groove by a bed, (d) retaining the plates in the relative positions in which they are placed in step (b) by use of suction, and (e) creating a weld in the welding groove by butt joint welding from the first side only of the plates.

19. A method according to claim 18, wherein step (e) comprises placing two welding wires close together to enter a common weld pool through a common contact nozzle, and supplying current to the welding wires from a common welding source.

20. A method according to claim 18, wherein step (e) comprises creating a weld in the welding groove by twin-arc welding.

21. A method according to claim 18, wherein the step of beveling each plate comprises form milling the plate.

* * * * *